United States Patent [19]

Goldberg

[11] Patent Number: 4,803,805
[45] Date of Patent: Feb. 14, 1989

[54] FLOWER ARRANGING DEVICE

[76] Inventor: Harold Goldberg, 4507 Ellenita Ave., Tarzana, Calif. 91356

[21] Appl. No.: 77,192

[22] Filed: Jul. 24, 1987

[51] Int. Cl.$^4$ .......................... A01G 5/00; A47G 7/07
[52] U.S. Cl. .................................................. 47/41.12
[58] Field of Search ..................... 47/41 R, 41.2, 41.1, 47/41.11, 41.12, 41.13; 428/23, 22, 27, 17; 248/278

[56] References Cited

U.S. PATENT DOCUMENTS 2,632,286  3/1953  Newhall ............................. 47/41.12
4,606,950  8/1986  Corbet ................................ 47/41.12

FOREIGN PATENT DOCUMENTS 941165  11/1963  United Kingdom ............... 47/41.12

Primary Examiner—Robert A. Hafer
Assistant Examiner—Danton D. DeMille

[57] ABSTRACT

A flower arranging device comprising one or more inverted truncated members disposed in spaced relationship to each other upon a floral foam base and coactive therewith to provide angularly disposed guides for positioning flowers or other similar materials therewithin.

11 Claims, 1 Drawing Sheet

FLOWER ARRANGING DEVICE

The present invention relates to a flower arranging device and more particularly to a novel device which enables one with limited training and experience to create designer-quality decorative arrangements with flowers and like pieces.

BACKGROUND OF THE INVENTION

The arrangement and placing of flowers, branches, leaves, and like items to create a decorative ensemble has heretofore required a great deal of skill and experience before a pleasant and beautiful product results. Presently one can use so-called flower frogs, vases, rings, and other such devices to assist in the placing and holding of flowers or other decorative items. Unfortunately, such assist products are relatively expensive and require reuse in order to minimize the unit cost of such arrangement. Also the several shapes and sizes necessary to accommodate all of the desired arrangements further adds both to the initial cost and storage costs of conducting such a business. In addition to the direct costs involved, there remains in most cases, a need to employ a skilled artisan to create the desired arrangement with the attendant increase in labor cost.

The present invention is directed to solving the foregoing problems and obviates the need to purchase and maintain expensive floral molds and premium priced labor, by providing simple, inexpensive, randomly formable and disposable means and methods for creating designer-quality floral arrangements therewith by relatively unskilled labor.

BRIEF SUMMARY OF THE INVENTION

The present invention relates to a new and improved flower arranging device and more particularly to a device comprising a plurality of inverted truncated members formed from waxed paper, Styrofoam ®, foil or like materials which are disposed in cooperating spaced relationship to each other upon the upper surface of a floral foam base and coact therewith to provide angular guides for the positioning of flowers or other similar materials therewithin.

Accordingly, a principal object of the present invention is to provide improved means and methods for producing designer-quality floral arrangements at a lower cost and with less-skilled personnel than heretofore required.

Another object of the present invention is to provide an improved device for creating floral arrangements comprising a plurality of disposable inverted truncated members disposed in spaced relationship to each other upon a floral foam base and coactive therewith to attractively position a plurality of cut flowers and like materials therewithin.

A further object of the present invention is to provide improved means and methods for creating professional quality floral arrangements in a quick and reliable manner without skilled labor.

These and still further objects as shall hereinafter appear are readily fulfilled by the present invention in a remarkably unexpected manner as will be readily discerned from the following detailed description of an exemplary embodiment thereof, especially when read in conjunction with the accompanying drawing in which like parts bear like numerals throughout the several views.

DESCRIPTION OF PREFERRED EMBODIMENTS

Figure 1:
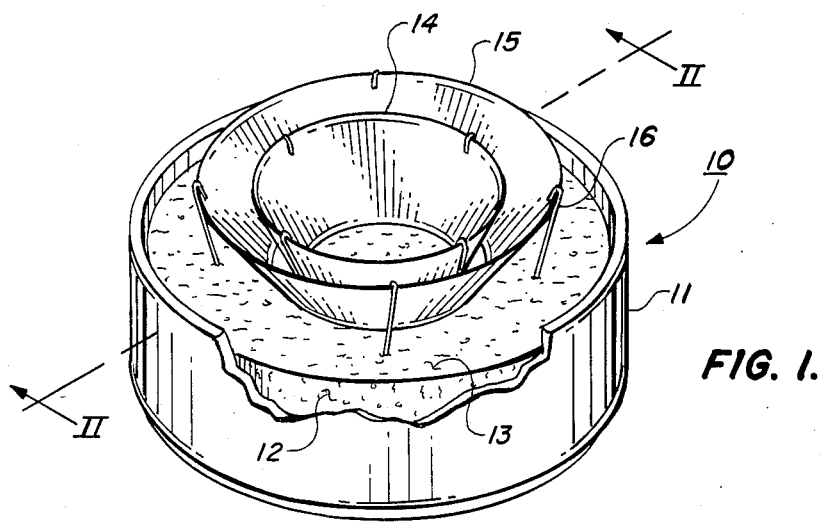
FIG. 1 is an isometric view of a flower arranging device embodying the present invention.

In one practice of the present invention, as shown in FIG. 1, a device embodying the present invention is identified by the general reference 10 and comprises a housing 11 into which is disposed a floral foam base 12 which may either partially or completely fill housing 11. On the upper surface 13 of base 12, first and second inverted truncated cones 14, 15 are disposed upon surface 13 in spaced concentric relationship to each other and secured to foam base 12 by suitable attaching means such as pin or clip 16. Cone 14 defines a first angle 17 with surface 13 which is, preferably, 60 degrees while cone 15 defines an angle 18 with surface 13, which is, for example, 45 degrees.

It should be noted that while a variation between the angles 17, 18, defined by each of the several cones 14, 15 with floral foam base 12 is important, the actual angles and the number of spaced members or cones can be varied to suit the exigencies of the housing 11 selected and the particular floral arrangement desired. Further, while truncated cones 14, 15 are herein depicted as representative of the truncated members or stem guides which are disposed upon the upper surface 13 of the foam base 12 in spaced relationship to each other, the advantage of the present invention is not limited to the annului defined thereby because members 14, 15 may be shaped to create a variety of diverse shaped openings within the boundary thereof such as oblong, elliptical, rectangular or even random or irregular patterns which can be discerned at the interface of such members with the upper surface 13 of foam base 12, a more critical factor, as will appear, is the spaced relationship therebetween adjacent members for receiving the stems therewith.

Figure 2:
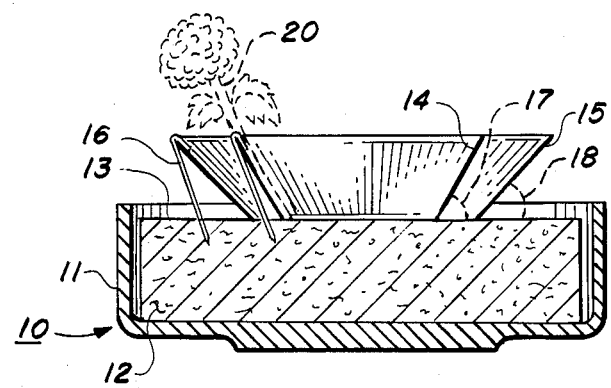
FIG. 2 is a cross section of the device of FIG. 1 taken on line II—II.

In use, the stems of the flowers or the proximal ends of the decorative material selected will be embedded into floral foam base 12, which can be either wet or dry depending on the type of flowers employed in the arrangement, and for the most part while engaging the inner surface of the stem guides or members 14, 15. The angles at which the several flower stems 20 enter the foam base 12 will be determined by the interacting of each stem with the interior surface of the truncate member 14, 15 adjacent thereto as shown in FIGS. 2 and 4.

The arrangement of floral pieces is completed by embedding subsequent flowers or like decorative pieces into the foam base 12 by following the inner contours of truncated members 14, 15 and any other member employed therewith in spaced relationship thereto to provide the several varied retainer slopes as desired. The decorative piece is completed by mounting several floral members within the interior member 14 at about 90 degrees to the floral foam base 12.

Figure 4:
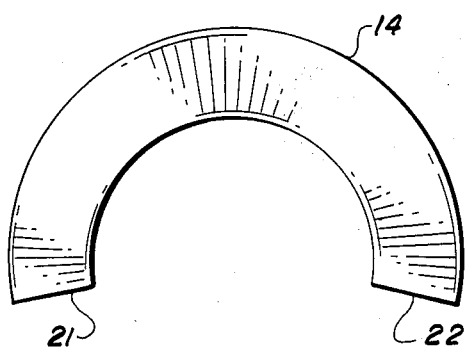
FIG. 4 is a plan view of a typical pattern for making a frustoconical flower arranger in accordance with the present invention.
Figure 3:
FIG. 3 is an isometric view of a flower arrangement created in accordance with the present invention.

The inverted truncated members herein described can be readily produced on an ad hoc basis using a basic pattern of the tape shown in FIG. 4 or modification thereof. Thus, members of various heights and included angles can be created from a starting strip and then varying the width of the strip or the curvature of its arc or the angles its end members 21, 22 defined with the arc. When the configuration of choice is the truncated cone, members 14, 15 are readily assembled from the basic pattern illustrated in FIG. 4 by attaching ends 21, 22 to each other as by overlapping one over the other, and securing the lapped portions in that position with a suitable glue or adhesive or fastener. The other variations of configuration herein described can be created and assembled in a similar fashion using this teaching and ordinary skill. The members, as described herein, can be made from any suitable flexible material such as waxed paper, aluminum foil, cardboard, Styrofoam ® or the like.

The above description for the creation of round floral arrangements may be readily followed to form oblong, elliptical, square or random shaped arrangements by simply distorting the strip to the desired shape and maintaining that shape through the use of pins 16 or with cellophane tape, adhesive, staples or like means.

From the foregoing, it is apparent that an invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what I claim is:

1. A flower arranging device comprising a housing; a floral foam base disposed within said housing and having an upper surface; a plurality of truncated cone members extending above said upper surface each cone member spaced in concentric relationship to an adjacent cone member, each such cone member having a lateral surface for supporting a plurality of flowers leaned thereagainst and engaging said upper surface of said foam base to define a different discrete angle therewith, and a plurality of pin members operatively associated with each of said cone members in spaced relationship to each other to secure said cone members to said foam base.

2. A flower arranging device according to claim 1 in which said floral foam base substantially fills said housing.

3. A flower arranging device according to claim 2 in which each said enclosed stem guide defines an oblong opening.

4. A flower arranging device according to claim 2 in which each said enclosed stem guide defines a rectangular opening.

5. A flower arranging device according to claim 2 in which each said enclosed stem guide defines a circular opening.

6. A flower arranging device according to claim 2 in which each said enclosed stem guide defines an irregularly shaped opening.

7. A flower arranging device according to claim 1 in which each said stem guide defines a different discrete angle with said upper surface of said foam base.

8. A flower arranging device according to claim 1 in which each said enclosed stem guide defines an oblong opening.

9. A flower arranging device according to claim 1 in which each said enclosed stem guide defines a rectangular opening.

10. A flower arranging device according to claim 1 in which each said enclosed stem guide defines a circular opening.

11. A flower arranging device according to claim 1 in which each said enclosed stem guide defines an irregularly shaped opening.

* * * * *